United States Patent
Chhabra et al.

(10) Patent No.: US 10,684,945 B2
(45) Date of Patent: Jun. 16, 2020

(54) SYSTEM, APPARATUS AND METHOD FOR PROVIDING KEY IDENTIFIER INFORMATION IN A NON-CANONICAL ADDRESS SPACE

(71) Applicant: Intel Corporation, Santa Clara, CA (US)

(72) Inventors: Siddhartha Chhabra, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 15/939,871

(22) Filed: Mar. 29, 2018

(65) Prior Publication Data

US 2019/0042402 A1 Feb. 7, 2019

(51) Int. Cl.
| | |
|---|---|
| G06F 12/02 | (2006.01) |
| H04L 9/08 | (2006.01) |
| G06F 12/14 | (2006.01) |
| H04L 9/14 | (2006.01) |
| G06F 12/1036 | (2016.01) |
| G06F 9/455 | (2018.01) |

(52) U.S. Cl.
CPC ...... *G06F 12/0215* (2013.01); *G06F 9/45558* (2013.01); *G06F 12/0207* (2013.01); *G06F 12/1036* (2013.01); *G06F 12/1408* (2013.01); *G06F 12/1475* (2013.01); *H04L 9/088* (2013.01); *H04L 9/0894* (2013.01); *H04L 9/14* (2013.01); *G06F 2009/45587* (2013.01); *G06F 2212/651* (2013.01); *G06F 2212/68* (2013.01)

(58) Field of Classification Search
CPC ............ G06F 12/0215; G06F 12/1036; G06F 9/45558; G06F 12/1475; G06F 12/1408; G06F 12/0207; G06F 2212/651; G06F 2212/68; H04L 9/14; H04L 9/0894; H04L 9/088
See application file for complete search history.

(56) References Cited

U.S. PATENT DOCUMENTS

| | | | |
|---|---|---|---|
| 7,111,145 B1 * | 9/2006 | Chen ................... | G06F 12/1036 711/206 |
| 9,244,855 B2 * | 1/2016 | Grochowski ....... | G06F 12/1027 |
| 2012/0159184 A1 * | 6/2012 | Johnson .............. | G06F 21/6218 713/189 |
| 2014/0380009 A1 * | 12/2014 | Lemay .................. | G06F 12/145 711/163 |

(Continued)

OTHER PUBLICATIONS

Intel, "Intel Architecture Memory Encryption Technologies Specification", Dec. 2017, 30 pages.

(Continued)

*Primary Examiner* — Francisco A Grullon
(74) *Attorney, Agent, or Firm* — Trop, Pruner & Hu, P.C.

(57) ABSTRACT

In one embodiment, an apparatus includes a page miss handler to receive a full address including a linear address portion having a linear address and a key identifier portion having a key identifier for a key. The page miss handler may insert an entry including this key identifier in a translation storage. The apparatus further may include a remapping table having a plurality of entries each to store information regarding a key identifier. Other embodiments are described and claimed.

20 Claims, 11 Drawing Sheets

(56) References Cited

U.S. PATENT DOCUMENTS

2016/0110298 A1* 4/2016 Koufaty ............. G06F 12/1466
                                                        726/28
2017/0091487 A1* 3/2017 Lemay ................ G06F 9/45533
2017/0285976 A1* 10/2017 Durham .................. G06F 21/79
2018/0034792 A1* 2/2018 Gupta ................... G06F 21/602

OTHER PUBLICATIONS

U.S. Appl. No. 15/283,339, filed Oct. 1, 2016, entitled "Multi-Crypto-Color-Group VM/Enclave Memory Integrity Method and Apparatus," by David M. Durham, et al.
U.S. Appl. No. 15/815,917, filed Nov. 17, 2017, entitled "Support for Increased Number of Concurrent Keys Within Multi-Key Cryptographic Engine," by Siddhartha Chhabra, et al.
U.S. Appl. No. 15/714,217, filed Sep. 25, 2017, entitled "System, Apparatus and Method for Page Granular, Software Controlled Multiple Key Memory Encryption," by David M. Durham, et al.

* cited by examiner

SYSTEM, APPARATUS AND METHOD FOR PROVIDING KEY IDENTIFIER INFORMATION IN A NON-CANONICAL ADDRESS SPACE

TECHNICAL FIELD

Embodiments relate to memory encryption in a multiple tenant computing environment.

BACKGROUND

In some computing systems, information stored in memory is protected by encryption. Some such systems, particularly for cloud-based usages, provide cryptographic memory integrity by way of Multi-Key Total Memory Encryption (MKTME). These and other key-based encryption technologies have a fundamental scaling problem. Specifically, MKTME uses bits of a physical address to select cryptographic keys, and page table entries include key identifiers (KeyIDs) to identify the keys.

Typical page table entries are 64 bits, providing just enough space to encode a 64 bit physical address as a 52 bit memory page address. That only leaves 12 bits for page table permissions, memory types, present, accessed/dirty, etc., with remaining page table entry bits used by software. As such, current implementations cannot specify KeyIDs in page table entries without limiting the addressable memory space. One solution is to increase the page table entry size, but this comes at a high price, changing fundamental system software/paging kernels, among other performance and efficiency issues. Further while the physical address space issue can be mitigated non-architecturally (not exposed to software), by simply adding more physical address bits to caches and buses, or by introducing additional cached metadata, the page table encodings are architectural and exposed to software.

DETAILED DESCRIPTION

Figure 1:
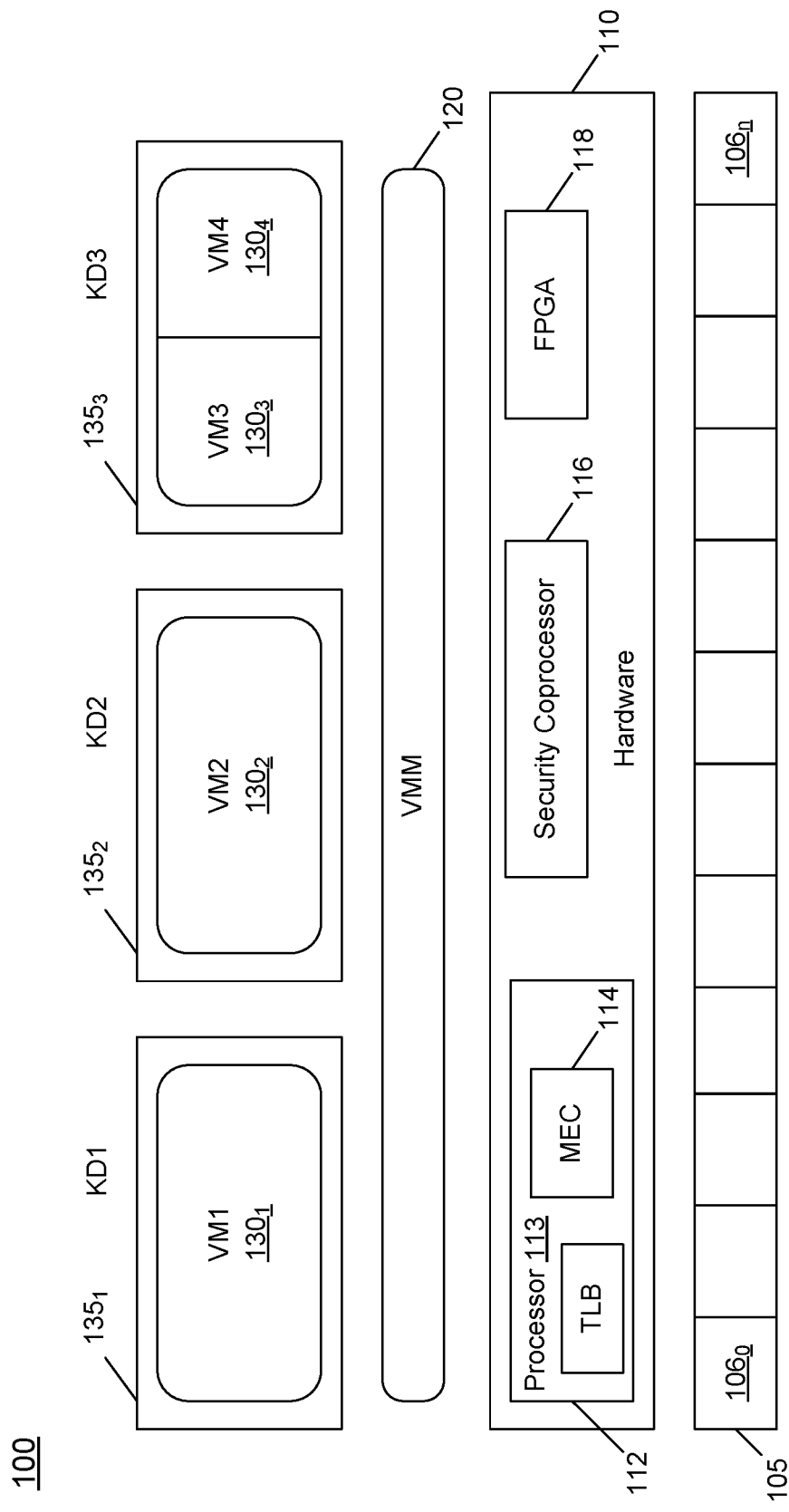
FIG. 1 is a block diagram of a multi-tenant computing environment in accordance with an embodiment.

In various embodiments, a key identifier (KeyID), which is used to identify a cryptographic key associated with the KeyID, may be specified outside of paging, in the linear address space itself. More specifically, at least a portion of non-canonical address bits (unused portions) e.g., of a 64 bit (b) linear/logical address, may be used to specify the key identifier or a portion thereof. With this arrangement, a software entity (e.g., a virtual machine (VM)) can specify a KeyID in a linear address space of a memory request. Such KeyID may be combined with one or more KeyIDs that are assigned to the entity by management software (e.g., a virtual machine monitor (VMM), hypervisor or other supervisor), forming a KeyID namespace used to select a key used for memory encryption and/or integrity. Although linear addresses in typical system implementations are 64 b wide, most systems only support a subset of these bits for use in addressing. As an example, current implementations typically support only 48 b of linear address space allowing for 256 terabytes (TBs) of linear address space, much more than needed in the foreseeable future. As such, 16 b in the linear address space can be reserved for KeyID specification, which translates to 64K separate keys, offering a highly scalable solution for multi-key encryption. Likewise, future architectures may further extend the linear address size, for example to 128 bits, allowing far more addressable memory whilst also enabling even more room for specifying KeyIDs within the linear address.

To enable more secure usage models, in some cases a KeyID re-mapping table (KMT) is provided to maintain an association of the KeyIDs owned by security domains (e.g., VMs). That is, while specification of a KeyID in a linear address allows for greater scalability in the number of keys, it also enables less privileged software control of KeyID, which can have security implications. As an example, with multiple keys used to isolate VMs in a cloud environment, one VM can specify the KeyID belonging to another VM and in collusion with the VMM read data belonging to another VM, thereby resulting in confidentiality leaks and breaking isolation properties of the system.

In order to maintain security, embodiments thus may leverage a KeyID re-mapping table (KMT). In a multiple VM scenario, each VM may be assigned one or more KeyIDs by the management software. The number of keys allocated to a particular VM can vary; KeyIDs are a system resource assigned by the management software even if the management software is not in the trust boundary of the VM. Note that it is the key associated with the KeyID that affords the isolation properties and not the KeyID itself. During a page walk, as a page miss handler uses bits within the linear address to construct a host physical address, it also looks up the KMT with the KeyID to ensure that the KeyID specified by software in the linear address is one of the KeyIDs assigned to it. If no match is found, the page walk is aborted and a corresponding translation lookaside buffer (TLB) entry is filled with an abort page translation, ensuring cross-domain isolation properties of the solution. Otherwise in the case of a match, the TLB entry may be filled with a correct physical address and, in some cases, the KeyID itself (or at least a portion thereof).

Embodiments provide a scalable solution for systems in which large numbers of keys (e.g., many thousands) are used for non-volatile random access memory (NVRAM) file encryption or other usages such as data corruption detection (crypto colors, a.k.a. memory tagging) with memory integrity. Using a non-canonical linear address space to explicitly carry key identifier information within every software-defined memory address in accordance with an embodiment provides a scalable solution.

Scalability is achieved with the use of non-canonical address bits as a cryptographic key (e.g., a NVRAM file encryption key) may be identified at the VM/application level (e.g., the application knows which memory file it is accessing and which key is to be used to access the file, so the application will set the non-canonical linear address bits to the associated KeyID). This is so, as another solution may require changes to paging structures to carry such information. At the same time, embodiments maintain the security of the isolation solution.

Understand that while embodiments are explained using VM isolation as a usage scenario where multiple VMs running on a VMM are isolated from each other using separate keys, other usages and applications are possible. For example, even when no VMM usages are possible when an OS controls the hardware, a user space application may still use non-canonical address bits to identify keys. Using embodiments, a memory execution circuit of a processor such as a multi-key total memory encryption (MKTME) execution circuit can support a larger number of keys, without consuming physical address bits or any additional cache resources.

In embodiments, a key table (also referred to herein as a "KeyID table") stored in memory and access controlled by the MKTME execution circuit may store keys. These are the individual keys provided by VMs or other agents allocated a given memory portion, which may be wrapped with a secret key only known to the hardware platform (e.g., derived from a fuse key or physically unclonable function (PUF)) prior to storage in the key table. As the MKTME execution circuit retrieves keys from this table, it may cache individual keys, assuming they will be reused for subsequent memory accesses to avoid memory latency for read operations. In embodiments, this key cache is logically internal to MKTME execution circuit, and is exclusively accessed by the MKTME execution circuit. Some embodiments may have sufficient on-chip memory such that the whole key table may be stored within the MKTME execution circuit.

In typical virtualized environments, a host VMM/hypervisor (referred to as a "VMM" or "host VMM" hereinafter) has full control over the guest VMs that the host VMM manages. The host VMM can read/write guest VM memory, modify guest VM control flow (single step, rewind, repeat, debug), read/modify guest VM register state, read/modify guest VM control structures, and so on. However, this complete control over the execution of the guest VM may pose a security risk that the host VMM is compromised and may modify the guest VM such that a customer's secrets and data residing within the guest VM are exposed.

In a typical virtualized environment, with a switch from one virtual machine to another, data structures that pertain to the execution state of the virtual machine are modified by the VMM. These data structures may include a virtual machine control structure (VMCS) and memory mappings (e.g., page tables and extended page tables (EPTs)). The VMCS is a data structure in memory that exists once for each logical processor for each guest VM, while the guest VM is managed by the host VMM. In a multi-processor system, each processor simultaneously executing the guest VM may have a unique VMCS. With every change of the execution context between different VMs, the VMCS is restored for the currently-executing VM, defining the state of the VM's virtual processor. When the execution context switches (VMExits) from a guest VM back to the host VMM, the same VMCS structure is used to restore the host's processor state from the host state area of the VMCS.

The operating system for a guest VM may form its own memory mappings between virtual and guest physical memory addresses (GPAs) using its own page tables. The VMM then uses extended page tables (EPTs) to map GPAs to the actual physical addresses (PAs) used by hardware to access physical memory. However, these VMM controlled memory mappings can be used by the VMM to compromise a guest VM.

Embodiments enable a host VMM to operate "blindly," without the ability to access data within a guest VM or the ability to access directly control structures that control execution flow of the guest VM. Guest VMs execute within a protected region of memory that even the host VMM cannot access. In one embodiment, the protected region of memory in which a guest VM executes is implemented as a key domain, which is encrypted with a consumer-provided key domain key (hereafter "key").

In some embodiments, Intel®'s Virtualization Technology (VT) and Trusted Execution Technology (TXT) are used in conjunction with a protected memory range inaccessible by the VMM (but originally accessible to TXT), and/or memory encryption technology such as Intel®'s Total Memory Encryption (TME), TME with Integrity (TMEi) or Memory Encryption Engine (MEE), or another memory execution circuit as described herein. Embodiments thus may remove a public cloud services provider's VMM/hypervisor code from the Trusted Code Base (TCB) of the guest virtual machine (VM)/workload. These techniques protect the consumer's workload from access by the host VMM, yet enable the host VMM to retain full control of the platform and manage guest virtual machines running on the platform. Using memory encryption technology in accordance with an embodiment may protect guest VM workloads from physical attacks and prevent the host VMM from accessing the VM's (encrypted) memory. Neither the cloud service provider's software, administrators, nor anyone with physical access to the cloud service provider's servers can access or modify protected guest VMs.

Referring now to FIG. 1, a block diagram of a multi-tenant computing environment 100 is shown. Environment 100 includes hardware resources, including a memory 105 and bare metal hardware 110, such as may be present in a particular server computer system. In the embodiment shown, memory 105, which may be a system memory, e.g., formed of dynamic random access memory (DRAM), includes a plurality of pages $106_0$-$106_n$. In embodiments, each page may be allocated to a particular entity, and may be protected by a key associated with that entity. In embodiments herein, a KeyID in turn is associated with the key to allow addressing mechanisms to pass this KeyID along to enable access to the key.

As further illustrated, server hardware 110 includes at least one processor 112 such as a given multicore processor or other system on chip (SoC). Of interest herein, processor 112 includes a translation lookaside buffer (TLB) 113, which may store mapping entries associating a given linear address with a physical address. Further as described herein in some cases KeyIDs (or at least a portion thereof) may be stored along with physical addresses within TLB 113. As further illustrated, processor 112 also includes a memory execution circuit 114 which may perform various operations associated with memory, including encryption/decryption, compression and so forth. Still further illustrated in FIG. 1, server hardware 110 may also include a security coprocessor 116 and one or more field programmable gate arrays (FPGAs) 118, which may be configured to perform specialized functions as may be appropriate to a particular server configuration. For example, FPGA 118 may be configured to accelerate packet processing, media processing, machine learning or other artificial intelligence operations or so forth.

Running on server hardware 110 (which may include additional processing resources such as one or more additional multicore processors, memory, storage, network interface circuitry and so forth) is a VMM layer 120. VMM layer 120 is computer software or firmware that creates and runs VMs, such as VM1 $130_1$, VM2 $130_2$, VM3 $130_3$ and VM4 $130_4$ on server hardware 110. Each of VMs 130 is shown as standalone block in FIG. 1, representing different VMs all under the control of a common VMM layer 120. VMM layer 120 provides access to server resources, such as server hardware 110, to the VMs that it controls. VMM layer 120 uses data structures such as a virtual machine control structure and extended page tables (EPTs) to control execution of VMs. VMM layer 120 software or firmware is provided by a cloud services provider may be part of a trusted computing base (TCB) for certain VMs, which are trusting VM.

In the embodiment of FIG. 1, each VM 130 is encrypted with its own key (or potentially multiple keys per VM). Multi-key memory encryption architectures as in FIG. 1 enable the specification of KeyID at page granularity, e.g., by management software (e.g., VMM 120). In embodiments that provide software-based cryptographic isolation of memory on a page granularity, VMs $130_{1-4}$ are cryptographically isolated from the VMM/other VMs using different key domains $135_1$, $135_2$, $135_3$. Note that multiple VM $130_3$, $130_4$ may be present in a single key domain (and each associated with a different key). Understand while shown at this high level in the embodiment of FIG. 1, many variations and alternatives are possible.

Figure 2:
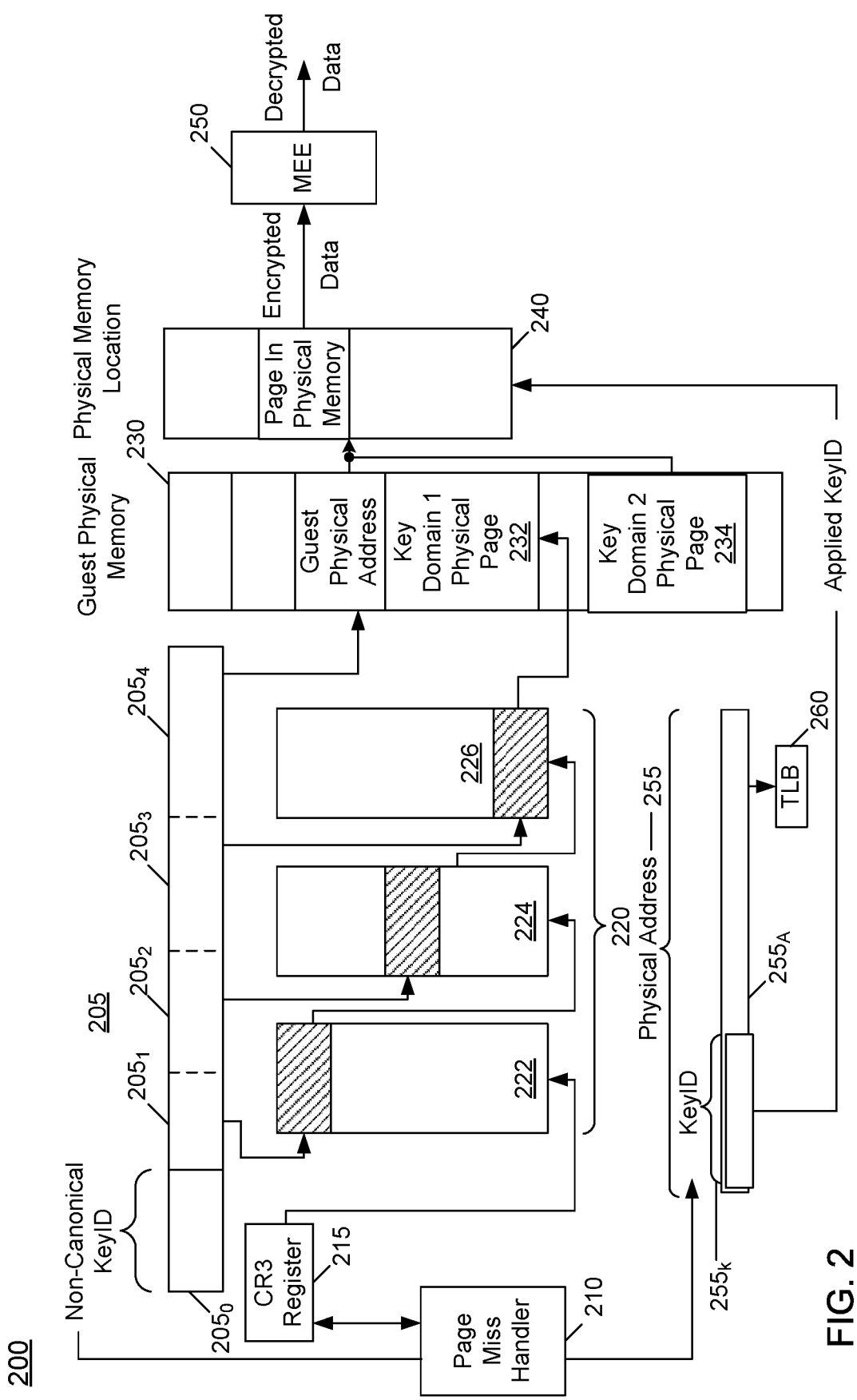
FIG. 2 is a block diagram of an address remapping environment in accordance with an embodiment.

Referring now to FIG. 2, shown is a block diagram of an address remapping environment in accordance with an embodiment. As shown in FIG. 2, environment 200 includes processor-internal components and processor-external components, including memory. More specifically, illustrated in FIG. 2 is an arrangement in which a full address 205 is received in a page miss handler 210 from a requester such as a VM or other software entity. By way of a page walk operation performed by page miss handler 210, a physical address 255 is obtained. In embodiments, full address 205 may be received from an application, such as an application or other process in execution on a VM. As used herein, understand the term "full address" is used to refer to an address that includes address information to identify a location in a physical memory, based upon a given entity's understanding of the memory. Thus a full address includes a so-called linear address (formed of linear address portions $205_1$-$205_4$ in FIG. 2), which is a software entity's view of an address space. This linear address in turn is translated into a physical address (and potentially multiple physical addresses, including a guest physical address and then in turn to a host physical address) that identifies an actual physical location in a physical memory. This is the case, as software typically does not have a visibility into the actual configuration of hardware resources, including memory mappings.

In accordance with embodiments, full address 205 also includes a KeyID portion or field $205_0$, which is used to provide a KeyID. The size of the KeyID may vary in embodiments. In one particular embodiment the KeyID may be 16 bits. Of course other sizes are possible. Note that the KeyID bits from full address 205 are not used in paging but instead pass through to the final (host) physical address and are eventually used to perform a key lookup in a KeyID table, which stores cryptographic keys. As further illustrated, full address 205 includes multiple address portions $205_1$-$205_4$ that collectively form a linear address. Each of these address portions may be used to access an entry in a given page table and/or identify an offset within a particular page of memory. More specifically in FIG. 2, a page table hierarchy 220 is illustrated as a four level page table structure. Of course embodiments are not limited in this regard and additional or fewer levels of a page table hierarchy may be present in other embodiments. Page table hierarchy 220 includes a plurality of page tables 222, 224, 226. In embodiments, page table hierarchy 220 may be stored in a system memory such as DRAM.

Page miss handler 210 walks the page tables/extended page tables of page table hierarchy 220 to translate a linear address to a machine/host physical address, which is used to reference memory. PMH 210 may, in embodiments, perform a KMT lookup, and insert the KeyID in the final/host physical address. Page miss handler 210 may determine a base address of first page table 222 using a pointer stored in a register 215, which in an embodiment may be a configuration register 3 (CR3) register. In turn, page miss handler 210 accesses a given entry (shown shaded in FIG. 2) within page table 222 using virtual address portion $205_1$. Thereafter, page miss handler 210 accesses a given entry (shown shaded in FIG. 2) within page table 224 (this page table residing at a base address identified by the address in the shaded entry of page table 222) using virtual address portion $205_2$. Page miss handler 210 next accesses a given entry (shown shaded in FIG. 2) within page table 226 (this page table residing at a base address identified by the address in the shaded entry of page table 224) using virtual address portion $205_3$.

Finally, the accessed entry within third page table 226 may be used to access a base address for a given physical page in a guest physical memory 230. More specifically, guest physical memory 230 includes multiple pages, each associated with a given key domain (two key pages 232, 234 are shown). As illustrated, a particular location within a first key domain physical page 232 may be accessed using an offset portion of virtual address 205, specifically address portion $205_4$. In turn guest physical memory 230 maps to a physical memory 240, such that a corresponding address within physical memory 240 may be accessed. To this end, while not shown for ease of illustration, additional mapping structures, including an extended mapping table to map guest physical addresses to host physical addresses may be present. Such mapping table may be used to determine an actual physical location within physical memory 240 for a host physical address associated with a given guest virtual address (in turn based on the received linear address).

Page miss handler 210, by walking page table 220, thus generates a physical address 255. As shown, physical address 255 includes an address portion $255_A$ and a key portion $255_K$. More specifically, address portion $255_A$ is formed using the physical addresses obtained from access to page tables 222-226 of page table hierarchy 220. And key portion $255_K$ may be passed through via page miss handler 210. Understand while in the embodiment of FIG. 2, the KeyID is shown as the most significant bits (MSBs) of full address 205 and physical address 255, the scope of the present invention is not limited in this regard and in other embodiments the KeyID may be differently located.

Page miss handler 210 sends physical address 255 to a translation lookaside buffer 260 for insertion into an entry. As such, more ready access to the LA-to-PA translation may occur by reference to the TLB. Stated another way, the latency of performing a page walk via page miss handler 210 may be avoided when an entry is present within a translation lookaside buffer. TLB 260 may be an expanded TLB to store the KeyID along with the physical address. Note that software can continue to see and use 52 bits of the physical address, allowing scalability. In other words, the KeyID is not necessarily part of the PA used to address physical memory.

As illustrated further in FIG. 2 for context of further memory operations as described herein, encrypted data may be output to a memory execution engine 250. In embodiments, memory execution engine 250 may decrypt the encrypted data using the corresponding key. Understand while shown at this high level in the embodiment of FIG. 2 and for ease of discussion, many variations and alternatives are possible. For example, different paging structures may be used to provide linear address-to-physical address translations. Furthermore, in the simplified example of FIG. 2, the full KeyID is received within full address 205 and is passed through page miss handler 210 for both insertion into a TLB entry and for use in performing a given memory access (namely to obtain a key from a KeyID table and/or access a KeyID remapping table). In other embodiments, at least some portion of the KeyID can be stored within entries of the paging structures themselves.

In some embodiments, the KeyID may be derived from a combination of bits in the linear address and the TLB memory mapping. As one example, there may be a top half and a bottom half of the KeyID, where the top half is from the upper linear address non-canonical bits and the bottom half is from the unused upper address bits of the physical address mapping from the TLB, as specified in the page tables. The actual physical address used by a caching fabric may have KeyID bits from both the original linear address and physical address mapping. Likewise, the KeyID may be metadata that is stored in the caching fabric to communicate which key to use for a particular memory transaction/cache line to a memory execution engine.

Also understand while shown in the embodiment of FIG. 2 as a hardware-based page miss handler, embodiments are not so limited. In other cases, page walk mechanisms may be implemented in firmware, software and/or combinations thereof. Furthermore, hierarchical KeyID arrangements are possible in which additional KeyID material is provided outside of the TLB. And in other embodiments, the KeyID material is not inserted into the TLB, to reduce pressure on the TLB.

Figure 3A:
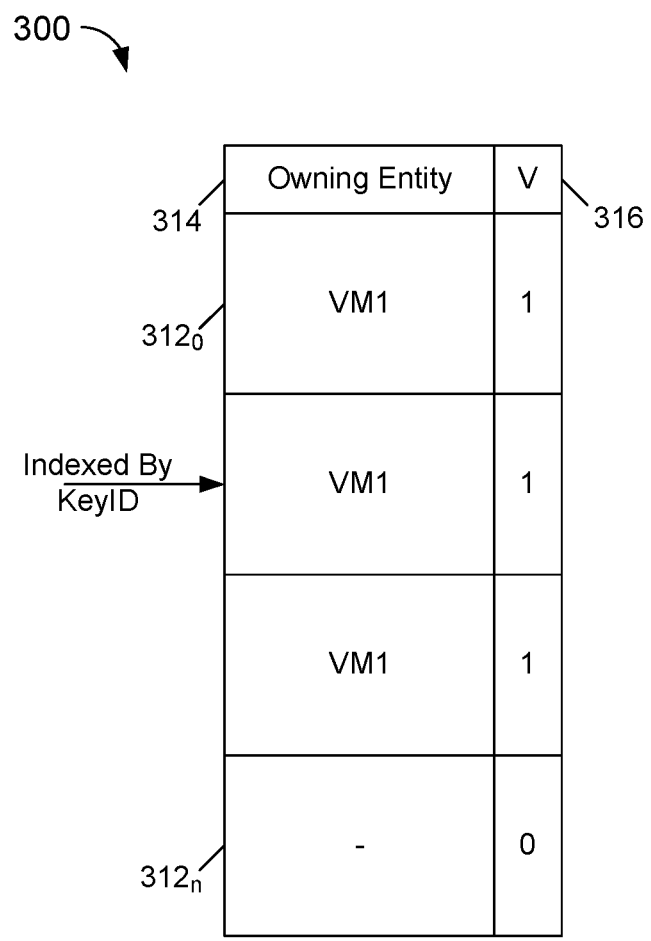
FIG. 3A is a block diagram of a KeyID remapping table in accordance with an embodiment of the present invention.

Referring now to FIG. 3A, shown is a block diagram of a KeyID remapping table (KMT) in accordance with an embodiment of the present invention. Such KMTs may be stored in various locations within a system, including processor-internal cache memories, system memories, among other possible locations. In an embodiment, a KMT re-mapping can be cached at each processor for optimal performance. For example, a full KMT may be stored in addressable memory (similar to page tables or extended page tables), with an additional per-processor local cache similar to a TLB that maintains a low latency translation table for the KMT mappings.

As shown in FIG. 3A, KMT 300 is implemented as an access control table. KMT 300 includes a plurality of entries $312_0$-$312_n$, each of which includes an owning entity field 314 and a valid field 316. Entries in KMT 310 are setup as KeyIDs are assigned to VMs. Owning entity field 314 carries the identity of the entity that owns the particular KeyID and hence is allowed to specify it in the linear address. Valid field 316, as the name suggests, indicates whether a KMT entry is valid or not. The example implementation shown here is indexed by the KeyID (e.g., obtained from an incoming full address (namely the MSBs) as discussed above). Various mechanisms may be used to allocate KeyIDs to VMs.

A KMT in accordance with an embodiment may be used to maintain ownership information for KeyIDs. With reference to FIG. 3A, as an example, with two VMs running on a platform supporting 4 KeyIDs, 3 KeyIDs (KeyIDs 1, 2, and 3) are allocated for VM 1 and no KeyID is assigned to VM2 (e.g., it is a VM with no security requirements). Thus entries $312_0$-$312_2$ show ownership by VM1, while the last entry $312_n$ is unowned. With these fields, each entry 312 may store an owner identifier for an owning entity for the associated KeyID, e.g., a given virtual machine, and by way of valid field 316, a valid indicator to indicate whether the corresponding entry is valid. Understand while shown at this high level in the embodiment of FIG. 3A, many variations and alternatives are possible.

Figure 3B:
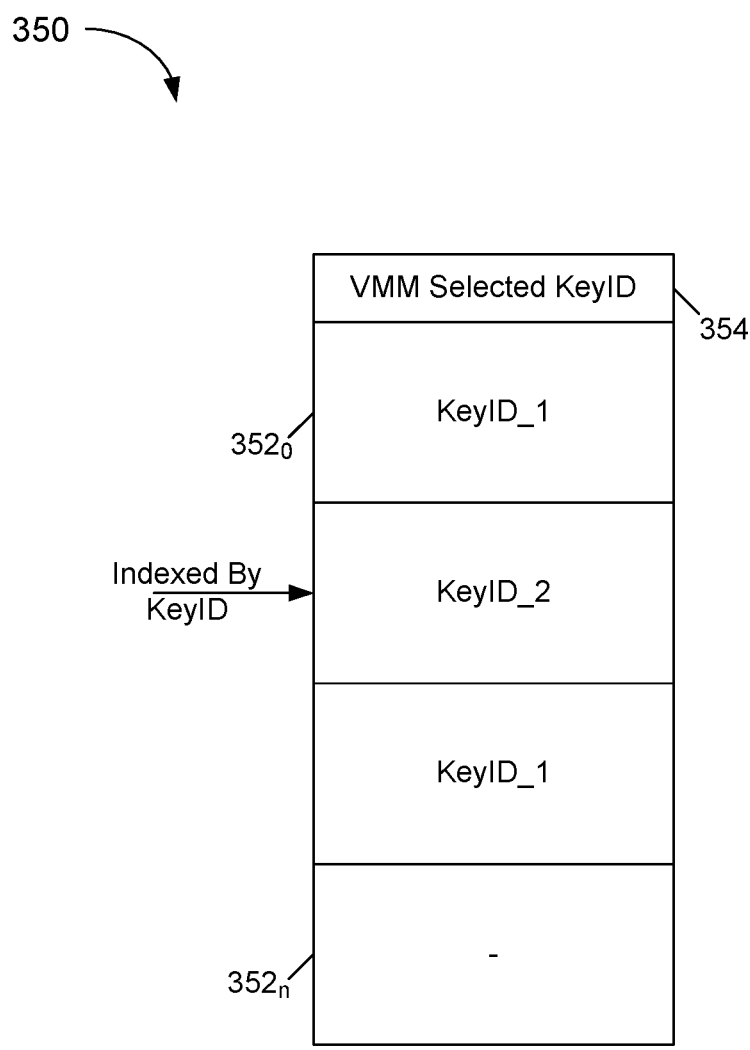
FIG. 3B is a block diagram of a KeyID remapping table in accordance with another embodiment of the present invention.

Referring now to FIG. 3B, shown is a block diagram of a KeyID remapping table in accordance with another embodiment of the present invention. As shown in FIG. 3B, KMT 350 is implemented as a translation table, such that a potentially larger number of KeyIDs can be mapped to a smaller number of assignable KeyIDs (e.g., as managed by a VMM). As illustrated, KMT 350 includes a plurality of entries $352_0$-$352_n$. As seen, each entry 352 includes a KeyID field 354, which may store a given KeyID as assigned by the VMM. As such, access to a given entry 352 within KMT 350 is performed using the KeyID of a full address, which is used to index into KMT 350. KMT 350 implemented as a translation table enables the VMM to directly choose what KeyID to use for a KeyID selected by the guest VM. This works with MKTME engine as the trusted execution environment where the VMM is in the TCB and is responsible for assigning the KeyIDs. In addition, a translation table supports additional usages such as migration where KeyIDs may be re-assigned. Understand while shown at this high level in the embodiment of FIG. 3B, many variations and alternatives are possible. For example in another implementation, a KMT may have a nested structure similar to page tables. As an example, an operating system (OS) mapping table could be followed by a VMM mapping table and finally by a hardware controlled mapping table.

On a TLB miss, the page tables and extended page tables are walked by the PMH hardware to determine the physical address to use for accessing memory. In this process, the PMH uses linear address bits specifying the KeyID to reference the KMT to determine ownership in cases where the KMT is an access control table. If, and only if, a particular KeyID specified in the linear address space is allocated to the particular VM, the KeyID bits are inserted in the TLB to allow further accesses to that page using that KeyID.

The PMH takes the linear address along with the access type for the incoming access that resulted in the TLB miss. The PMH extracts the KeyID bits from the linear address and uses these KeyID bits to lookup the KMT. If the KMT indicates that the KeyID is currently owned by the VM initiating the access and the KMT entry is valid, the PMH proceeds to do the page walk. Otherwise, the page walk is aborted and the TLB is loaded with abort page translation. This covers for the case where software attempts to use a KeyID it does not own to break the isolation guarantees of the system.

If ownership is established, the PMH proceeds to walk the page tables (walk page tables, check permissions, etc.). The final physical address is constructed as a concatenation of the physical address retrieved from the page tables and the KeyID retrieved from the LA. It is this PA that is loaded to the TLBs. There can be alternate implementations for not storing the KeyID in the TLB, but storing it as part of the PA allows the KeyID to naturally flow to the memory subsystem with the physical address of the memory access. In embodiments where the KeyID is obtained directly from the linear address, the KeyID is not stored in the TLB. In such embodiments, the TLB provides the PA, which is simply an address for physical memory and the KeyID bits from the LA are appended to this PA output from the TLB. The MKTME engine on its behalf receives the request and uses the KeyID portion of the physical address to lookup the key and use it for encryption/decryption. Note that in this use case, KeyID bits are removed from the physical address before accessing the memory.

With the KMT used as a translation table, there are no access control checks. With the translation table the KeyID retrieved from the linear address is used to index the KeyID and retrieve the final KeyID that will be used to lookup the key in the MKTME engine.

Figure 4:
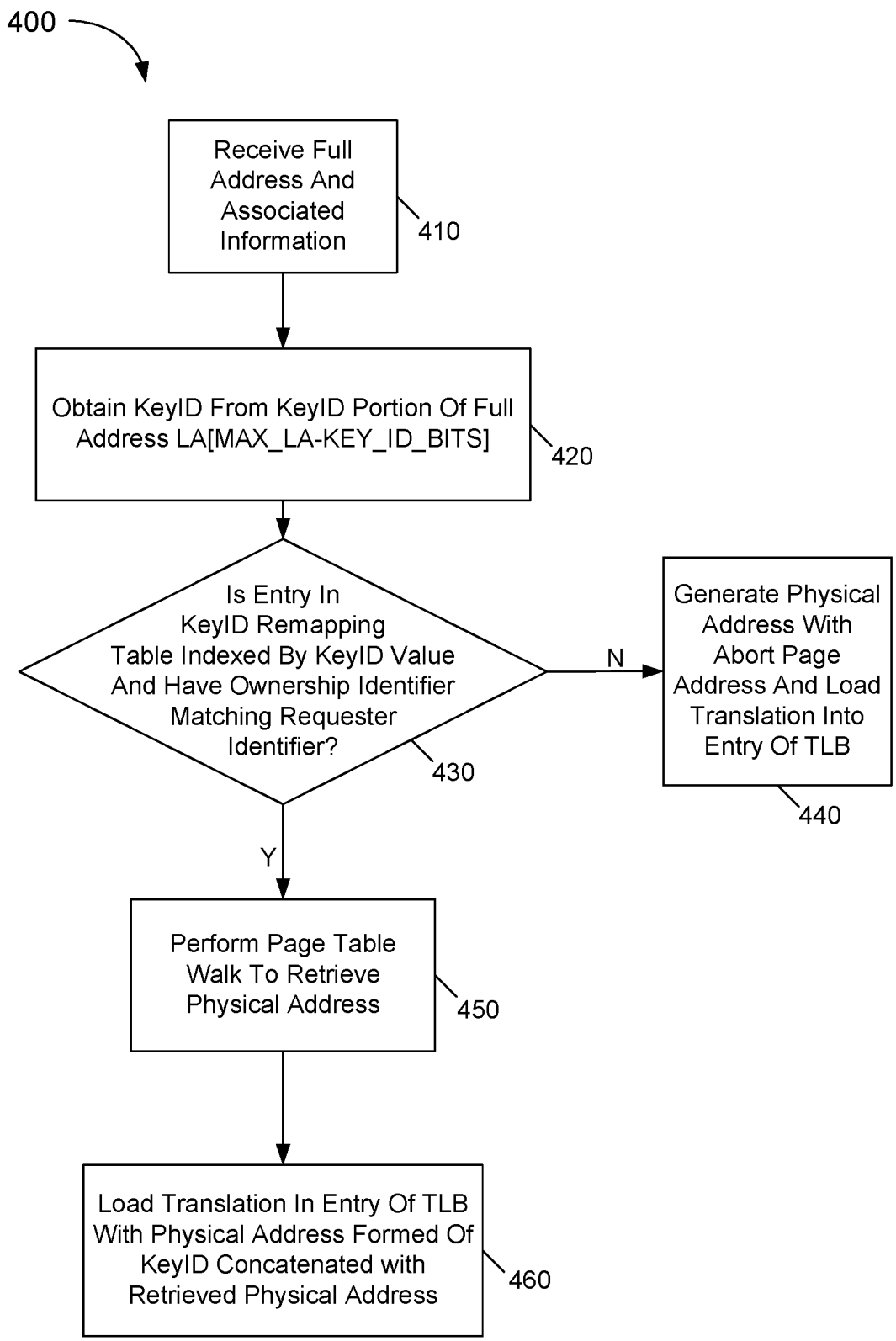
FIG. 4 is a flow diagram of a method in accordance with an embodiment of the present invention.

Referring now to FIG. 4, shown is a flow diagram of a method in accordance with an embodiment of the present invention. More specifically as shown in FIG. 4, method 400 is a method for performing a page walk in accordance with an embodiment in which a key remapping table is used for purposes of access control (namely for a security-applicable use model). During a page walk, the KMT is referenced by the PMH to determine if a particular VM is allowed to use a particular KeyID and ensures confidentiality in a VM isolation usage. As such, method 400 may be performed at least in part using a page miss handler, which may be implemented as hardware circuitry, firmware, software and/or combinations thereof.

As illustrated in FIG. 4, method 400 begins by receiving a full address (block 410). More specifically, this full address may be received within processor hardware for a given memory request (e.g., a read or write request). This full address includes a KeyID (or at least a portion thereof) and a linear address. The memory request further includes associated information, including an indication of the access type and an identifier of the source of the memory request, e.g., a given VM, as indicated by a VM identifier. Next, control passes to block 420 where the KeyID portion may be obtained from the full address (e.g., the MSBs of the linear address). Then it is determined at diamond 430 whether this KeyID portion is correctly associated with the requesting entity. Specifically, this KeyID may be used to index into the KeyID remapping table to find the corresponding entry. Then the VM identifier or other ownership information in the entry may be compared with the source identifier of the memory request to determine whether the requesting entity is in fact the correct owner of the KeyID.

If not, control passes to block 440 where a physical address is generated with an abort page address and a translation is loaded into an entry of the TLB. Note that this abort page address is a predetermined address within system memory. When this abort page address is encountered during normal operation (e.g., as a result of a memory request), the memory request is not honored. For example, for a read request, a predetermined value (e.g., all zeros) is returned, and a write request is dropped. This is the case, as based on the KeyID table lookup this KeyID is not received from a validated owner. As such, embodiments provide a security mechanism to enforce and isolate different VMs or other entities.

Instead if it is determined at diamond 430 that the requesting entity is valid owner of the KeyID, control passes to block 450 where a page table walk is performed to obtain the physical address. Thereafter, control passes to block 460 where the translation may be loaded into an entry in the TLB. More specifically this translation includes, in addition to the physical address (e.g., a guest physical address), the KeyID, which may pass through the page miss handler from its receipt as part of the full address.

Understand while shown at this high level in the embodiment of FIG. 4, many variations and alternatives are possible. For example, as discussed above to reduce pressure on the TLB, it is possible for the entry within the TLB to not include the KeyID. Instead in such cases, the KeyID received via the full address may be used to later access key material in cases in which the key remapping table is used for access control purposes. Or it is equally possible in such access control cases to use the KeyID received in the full address for purposes of access control in the KMT, prior to using the received KeyID for purposes of key access.

Figure 5:
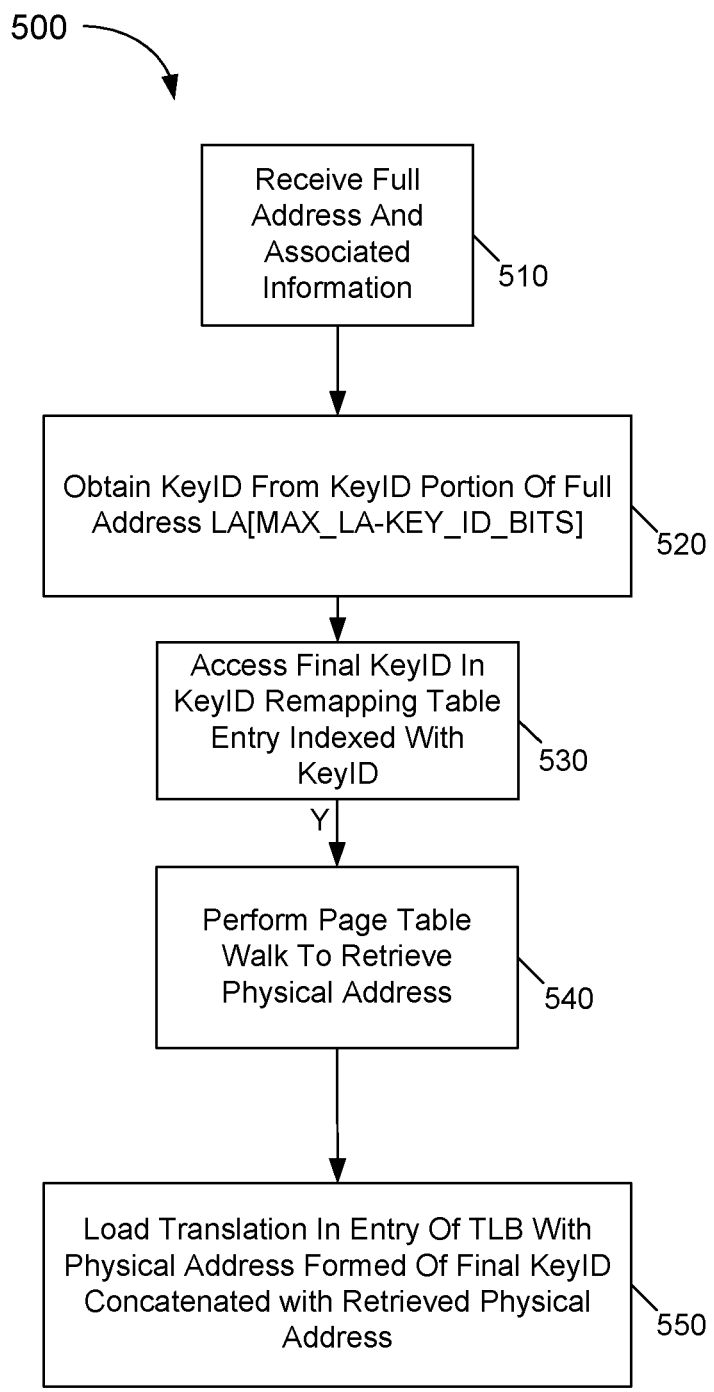
FIG. 5 is a flow diagram of a method in accordance with yet another embodiment of the present invention.

Referring now to FIG. 5, shown is a flow diagram of a method in accordance with yet another embodiment of the present invention. As shown in FIG. 5, method 500 is a method for performing a page walk in accordance with an embodiment in which a key remapping table is used as a translation table. As such method 500 may be performed at least in part using a page miss handler, which may be implemented as hardware circuitry, firmware, software and/or combinations thereof. During a page walk, the KMT is referenced by the PMH to identify a correct KeyID to be used for key access, rather than for access control as in FIG. 4.

As illustrated in FIG. 5, method 500 begins by receiving a full address for a given memory request, including a KeyID (or at least a portion thereof), linear address and associated information such as access type and source identifier (block 510). Next, control passes to block 520 where the KeyID portion may be obtained from the full address.

In this embodiment in which the key mapping table is used as a translation table, control next passes to block 530 where the received KeyID may be used to access an entry within the key remapping table to retrieve a final KeyID to be used for accessing a given key within a key table. Next, control passes to block 540, where a page table walk is performed to obtain the physical address. Thereafter, control passes to block 550 where the translation is loaded into an entry in the TLB. More specifically this translation includes the physical address (e.g., a guest physical address) and the final KeyID. Understand while shown at this high level in the embodiment of FIG. 5, many variations and alternatives are possible.

Figure 6:
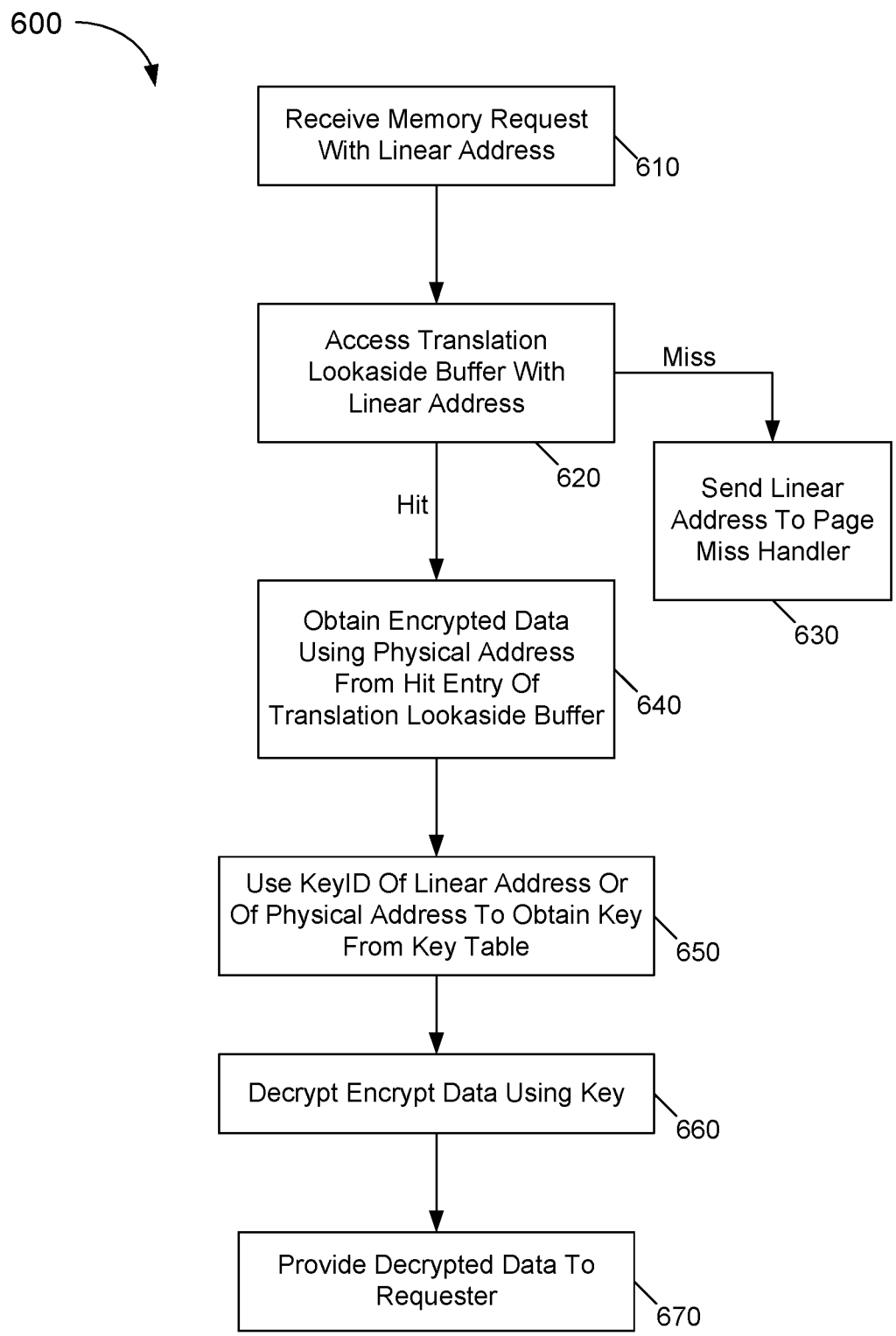
FIG. 6 is a flow diagram of a method in accordance with another embodiment of the present invention.

Referring now to FIG. 6, shown is a flow diagram of a method in accordance with another embodiment of the present invention. More specifically, method 600 illustrates another method for using KeyID information of a full address in performing lookup operations in accordance with an embodiment. As such, method 600 may be performed by combinations of hardware circuitry, firmware and/or software, including memory execution circuitry of a processor among other such circuits. As illustrated, method 600 begins by receiving an incoming memory request with a linear address (block 610). For example, a memory execution circuit of a processor may receive an incoming memory request from a given VM. As described above, this memory request includes a full address, including a KeyID and linear address, along with an indication of the requester (e.g., a VM identifier) and access type, among other such information. Control next passes to block 620 where a TLB of the processor can be accessed with the linear address. As such, based upon indexing into the TLB with this linear address it can be determined whether a valid translation is present in the TLB for the linear address. If not, control passes to block 630 where the linear address can be passed to a page miss handler. Note that in the absence of a valid translation, a page walk process by the page miss handler may be performed, e.g., in accordance with methods 400 and 500 discussed above with regard to FIGS. 4 and 5.

Still with reference to FIG. 6, instead if it is determined that there is a valid translation, control passes to block 640 where the physical address obtained from the hit entry can be used to obtain encrypted data. More specifically, a memory execution circuit may forward the memory request with this physical address (which may be a guest physical address, that in turn is converted to a host physical address) to the memory to obtain the requested data. In addition to obtaining the requested information based on the physical address, the KeyID may be used to access a KeyID table. Note that depending upon implementation, this KeyID may be obtained from the full address received from the memory requester. In other cases, such as in embodiments in which the KeyID can be included in the page tables, the KeyID may be instead obtained from the physical address.

In any event, at block 650 the KeyID is used to perform an access to the KeyID table to obtain the cryptographic key associated with the KeyID. This obtained encryption key can be then provided to the memory execution circuit, along with the encrypted data such that at block 660 a decryption operation may be performed using the cryptographic key. Understand that in some cases as where hierarchical key identifiers are used, a single key, associated with a VM or other entity is provided, and additional keying material may be used as a tweak for purposes of the decryption. In other cases, the KeyID itself may be used as the decryption key to perform the decryption. After decryption, control passes to block 670 where the decrypted data is provided to the requester, e.g., a given VM that requested the data by way of the memory request. Understand while shown at this high level in the embodiment of FIG. 6, many variations and alternatives are possible. For example, optional checks to a KeyID remapping table may be performed before the operations beginning at block 640.

Figure 7A:
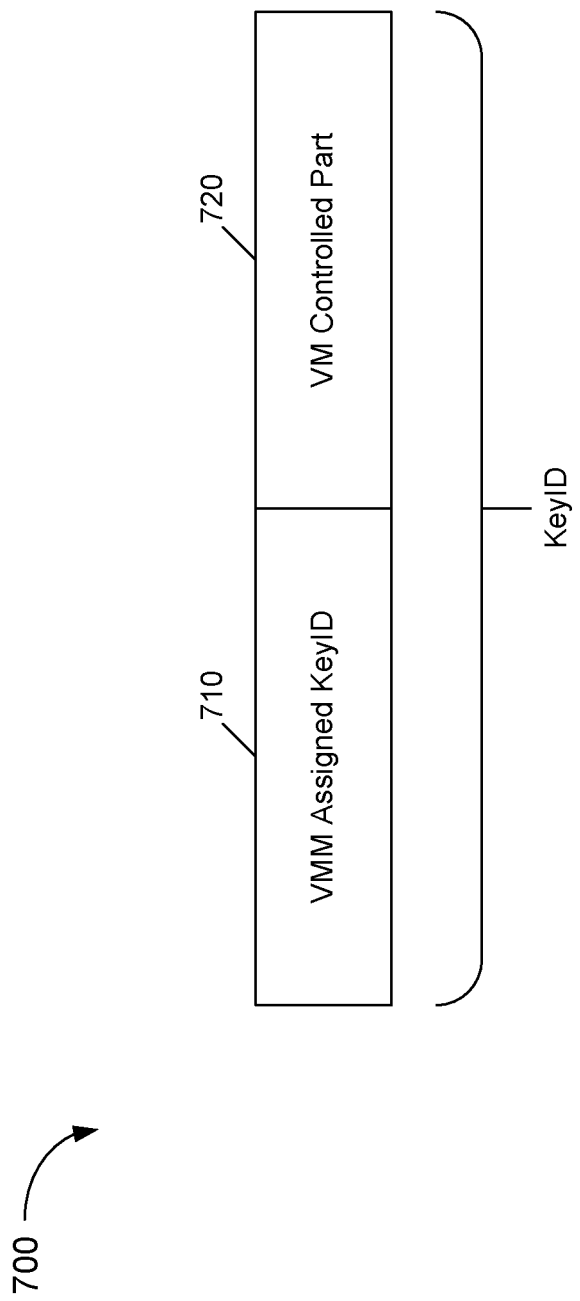
FIGS. 7A and 7B are block diagrams of a hierarchical key identifier in accordance with embodiments.

Referring now to FIG. 7A, shown is a block diagram of a hierarchical key identifier in accordance with an embodiment. More specifically, as illustrated in FIG. 7A, KeyID 700 is formed of a first KeyID portion 710 and a second KeyID portion 720. In an embodiment, first KeyID portion 710 may be a VMM-assigned KeyID, while second KeyID portion 720 is a VM-provided portion. In the embodiment of FIG. 7A, instead of a usage in which each VM is assigned one or more KeyIDs, which need not be contiguous, an alternate KeyID allocation technique is used. More specifically, the KeyID space is split hierarchically, where an (e.g.,) contiguous chunk of KeyIDs may be assigned to a VM, and the VM is free to use any KeyID in its space.

In this organization the linear address bits used as the KeyID are organized in a hierarchical fashion. The VMM assigns a VMM-assigned component 710 and the rest of the bits of portion 720 can be used by the VM as it desires. Different keys can be associated with the different KeyIDs. That is, a particular key can be selected by the combination of the VM-controlled portion and the VMM-controlled portion of the KeyID namespace. Or a single key can be associated with all the KeyIDs assigned to the VM. Alternatively, with this approach, the VM-controlled part can be used to generate a tweak for encryption. This approach can allow for greater scalability of keys, in which the MKTME engine uses a single key for a given VM but still achieves fine-grained separation using the VM-controlled part of KeyID as a component of the encryption or integrity tweak. Note that with this approach, a VM de-scheduled does not need to be assigned the same KeyID. The VMM-assigned component can be different as long as the same key is used to decrypt code and data in memory across suspension.

Figure 7B:
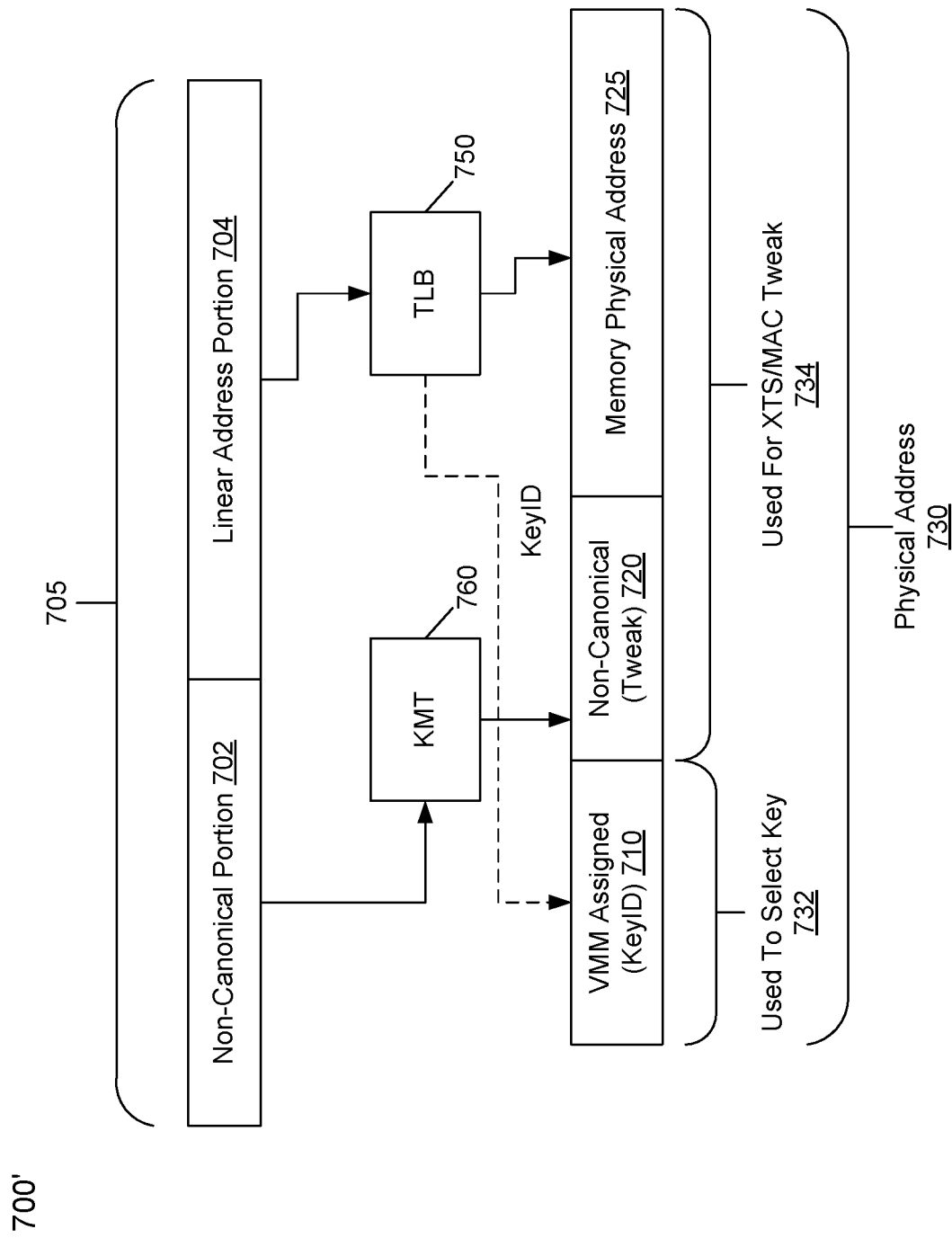

Referring now to FIG. 7B, shown is an embodiment of alternative KeyID usage models. Specifically, FIG. 7B shows an arrangement 700' in which a received linear address 705, namely a 64-bit address, includes a non-canonical address portion 702 and a linear address portion 704. Non-canonical address portion 702 may be used as a tweak. In accordance with embodiments herein, linear address portion 704 may be used to access translations in a TLB 750 to obtain a given physical address 725, corresponding to a location in external memory. In turn, non-canonical address portion 702 may be used to perform a lookup in a KMT 760 that outputs a non-canonical address portion 720. In addition FIG. 7B, shows an arrangement in which entries of TLB 750 optionally may further store a VMM-assigned KeyID portion 710.

Different flavors of usage models for the resulting physical address 730, which may be used as a cache line physical address, are possible. In one embodiment, VMM-assigned portion 710 (illustrated as portion 732) may be used to access a key table (not shown in FIG. 7B) to obtain a selected key. In turn, the remaining portion of physical address 730, formed of non-canonical address portion 720 and physical address 725, may be used for an XTS/MAC tweak 734. That is, VMM-assigned KeyID portion 710 may select the key, and VM (or application)-controlled portion 720 may be used as part of the tweak (e.g., tweak used in XTS encryption mode, which may include the physical memory address) by a memory execution engine. Alternatively, both halves together (710 and 720) may represent the KeyID selection as in the embodiment of FIG. 7A.

In one embodiment, VMM-assigned KeyID portion 710 may be obtained from the page tables/extended page tables and thereby be stored in TLB 750 (illustrated with dashed line). Meanwhile, non-canonical address portion 702 may be translated by KMT 760 separately from TLB 750, and the output of the KMT translation is appended as a non-canonical address portion 720 to address portion 725 and VMM-assigned portion 710 from TLB 750 to create final physical address 730 to be seen by caches and a memory controller.

In the simplest embodiment, the KMT is not used and non-canonical linear address portion 720 is directly appended/inserted as non-canonical address portion 720 into physical address 725 output by TLB 750 to form complete physical memory address 730 to be used by the caches and memory controller. This embodiment may also be used if VM-assigned portion 720 is simply interpreted as part of the address tweak by a memory execution engine.

Using non-canonical address bits and bypassing the paging-related TLBs may achieve better performance by reducing TLB pressure and enabling better granularity for selecting the keys. That is, a VM/application can select keys (or the tweak) on a cache line-by-cache line basis (e.g., 64 bytes) with each memory access, instead of on a page-by-page basis (e.g., 4096 bytes or more) through the TLBs. In this way, software can use different keys (or tweaks) for multiple data structures within the same memory page, for example, for purposes of memory tagging.

Figure 8:
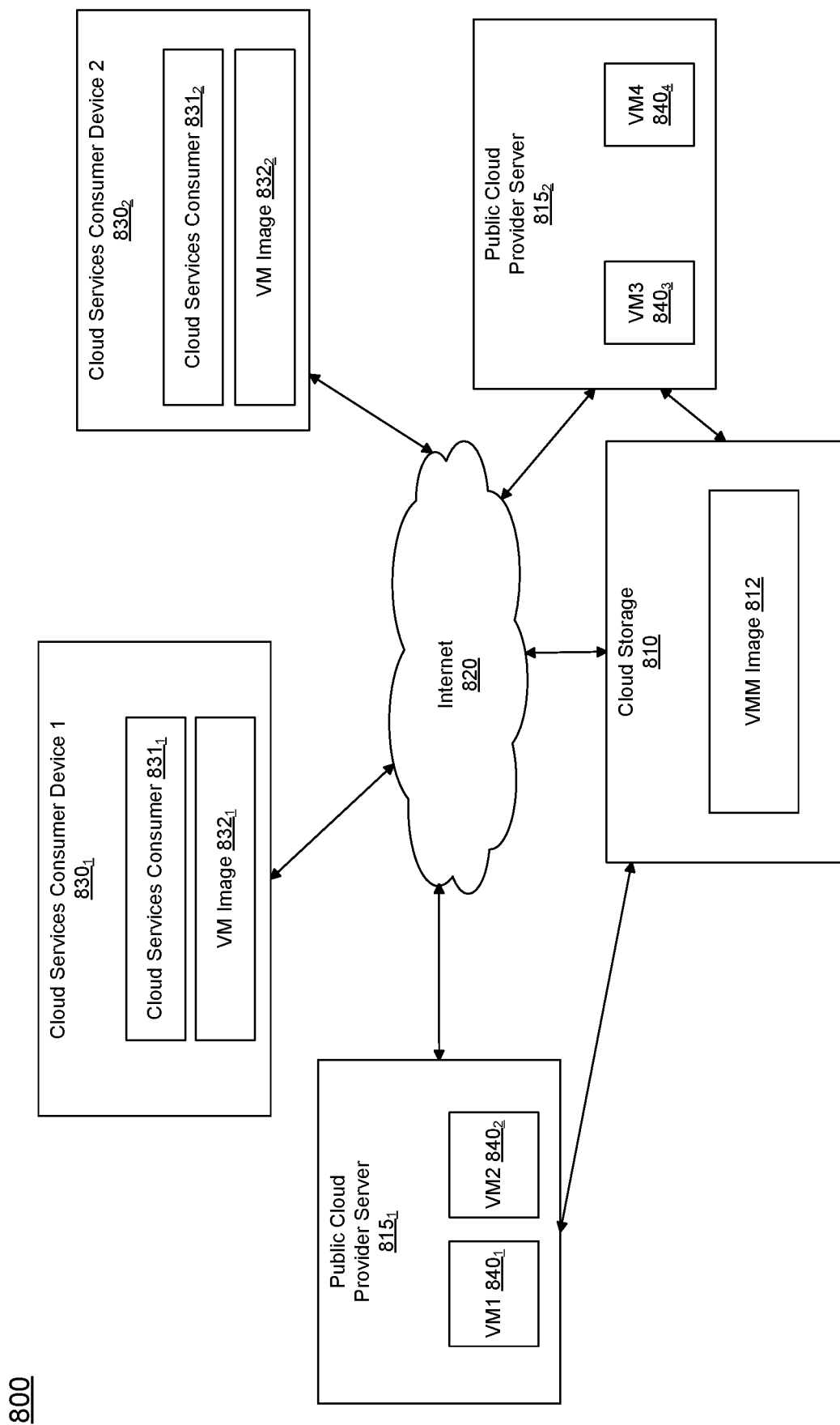
FIG. 8 is a block diagram of a cloud services environment in accordance with an embodiment of the present invention.

Referring now to FIG. 8, shown is a block diagram of a cloud services environment in accordance with an embodiment of the present invention. As shown in FIG. 8, network 800 can be used to allow consumers to request services, including virtualization services, from a public cloud services provider. As seen, network 800 can correspond to any type of communications network and can include many different types of computing devices interconnected via a given network such as Internet 820.

Cloud storage 810 can be provided as part of a data center that includes various computing devices, storage devices and so forth. As one example, cloud storage 810 can be a storage device that includes multiple storage components such as disks, optical, or semiconductor-based storage. Cloud storage 810 can act, for example, as a repository of master copies of various applications, including a VMM application that instantiates virtual machines to provide services in response to a consumer's request. In the embodiment shown in FIG. 8, a master copy of a VMM application is stored in the form of VMM image 812. VMM image 812 is a software image containing a software stack designed to provide a virtual machine platform in the form of a VMM.

Thus as further seen in FIG. 8, at the same location, e.g., as part of the same data center, one or more public cloud services provider servers, such as public cloud provider servers 815$_1$ and 815$_2$ can be coupled to cloud storage 810. In various embodiments, public cloud services provider servers can be used to service consumer services requests, including virtualization requests. For example, each public cloud services provider server may host one or more virtual machines on behalf of a consumer. In the example shown in FIG. 8, public cloud provider server 815$_1$ hosts two virtual machines, VM1 840$_1$ and VM2 840$_2$. Similarly, public cloud provider server 815$_2$ hosts two virtual machines, VM1 840$_3$ and VM2 840$_4$. VMs 840 may issue memory requests with linear addresses including KeyIDs as described herein.

As shown in FIG. 8, various consumer devices can be present, e.g., cloud services consumer devices 830$_1$ and 830$_2$. Such cloud services consumer devices may be personal devices of a given user such as a smartphone, tablet computer, desktop computer or so forth. Alternatively, cloud services consumer devices may be servers for an organization that consumes cloud services. In addition, cloud services consumer devices may be emulated via software.

Each of cloud services consumer devices 830$_1$ and 830$_2$ provides a respective cloud services consumer 831$_1$ and 831$_2$ and a respective VM image 832$_1$ and 832$_2$. Cloud services consumers 831$_1$ and 831$_2$ may be, for example, a client component of a cloud services application used to request cloud services. VM images 832$_1$ and 832$_2$ may be stored in storage (not shown) coupled to the respective cloud services consumer devices 830$_1$ and 830$_2$. These VM images are provided by the consumer to the cloud services provider and used to create a secure VM, such as VM1 840$_1$, running on the cloud provider's server 815$_1$.

In embodiments herein, VMs 840 may issue memory requests having linear addresses including KeyIDs as described herein. In turn, when accessing memory, a given memory execution circuit of one of servers 815 and/or consumer devices 830 may use this KeyID in determining whether to permit access to the requested memory location and/or for purposes of accessing a key storage (which may be located in different components of system 800), to access a relevant key. In turn this key can be used for performing encryption/decryption operations. Understand while shown at this high level in the embodiment of FIG. 8, many variations and alternatives are possible.

Figure 9:
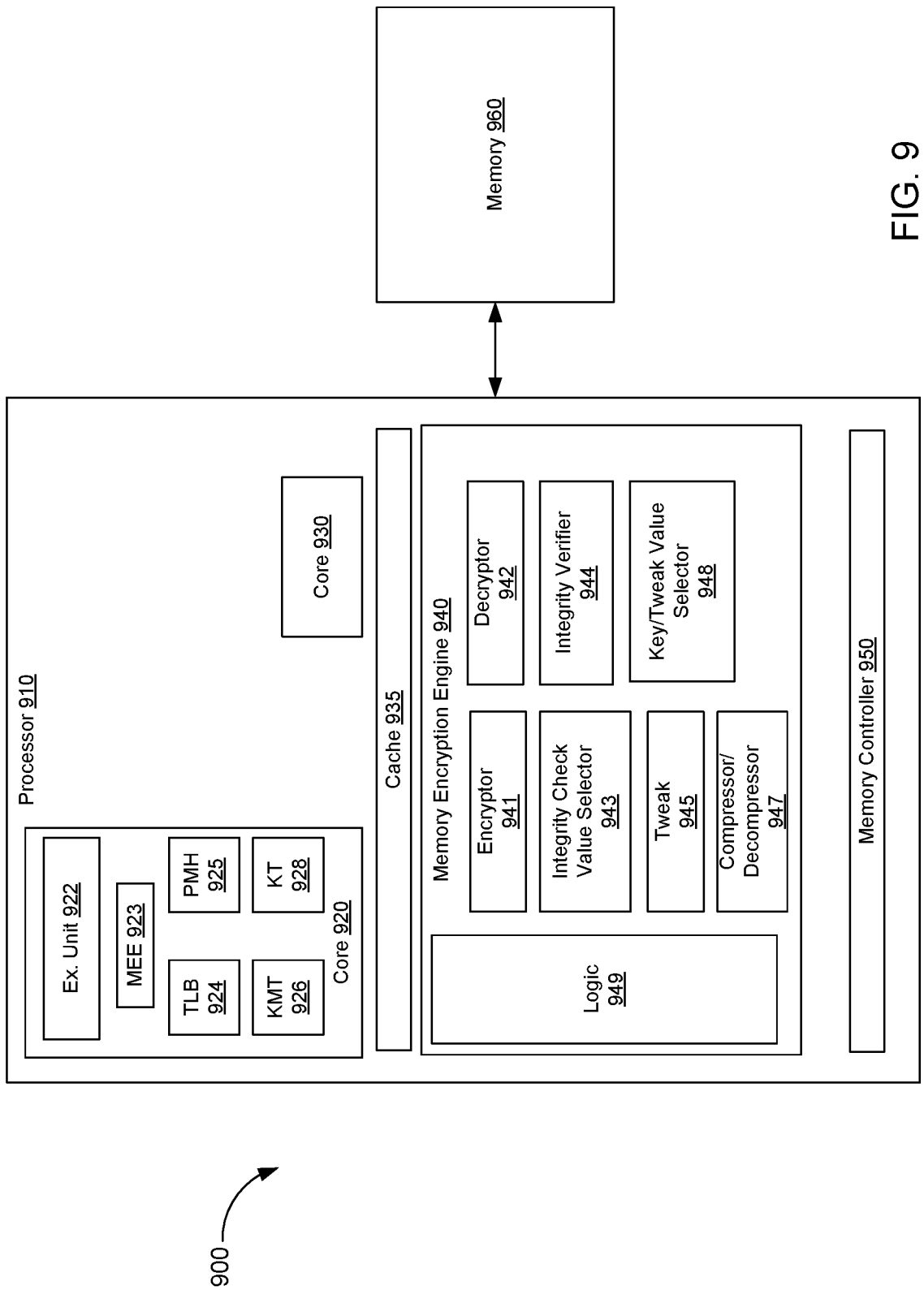
FIG. 9 is a diagram showing an apparatus in accordance with one embodiment of the invention.

FIG. 9 is a diagram showing an apparatus in accordance with one embodiment of the invention, which may be an apparatus 900 to secure a public cloud environment according to an embodiment. Apparatus 900 may include any computing device and/or data platform such as a laptop, personal digital assistant (PDA), media content player, imaging device, mobile Internet device (MID), any smart device such as a wireless smart phone, smart tablet, smart TV, computer server, and so on, or combinations thereof.

Apparatus 900 includes a memory 960. Memory 960 may be external to a processor 910 (e.g., external memory), and/or may be coupled to processor 910 by, for example, a memory bus. In addition, memory 960 may be implemented as main memory. Memory 960 may include, for example, volatile memory such as DRAM, non-volatile memory, and so on, or combinations thereof.

Memory 960 may be protected using encryption and integrity checking. In one embodiment, an encryption technique called a tweakable block cipher is used. A tweakable block cipher accepts a second input, called a tweak, along with plaintext or ciphertext input to be encrypted. The tweak, along with the key, selects the permutation computed by the cipher. For example, a tweak function may use a physical memory address as a tweak to a block cipher to bind unencrypted data with the physical memory address. A tweak function 945 may include, for example, XTS (XOR-encrypt-XOR)/XEX-based tweaked codebook mode with ciphertext stealing) algorithm, Liskov, Rivest, and Wagner (LRW) algorithm, and so on, or combinations thereof. And in embodiments herein, the tweak may be a VMM-provided portion of a hierarchical KeyID as described above.

Processor 910 may include any type of processor such as, for example, micro-processor, an embedded processor, a digital signal processor (DSP), a central processing unit (CPU), a graphical processing unit (GPU), a visual processing unit (VPU), a network processor, a device to execute code to implement the technologies described herein, and so on, or combinations thereof. Processor 910 may include one or more cores such as, for example, a core 920 and a core 930. Cores 920, 930 may include a single-threaded core, a multithreaded core including more than one hardware thread context (or "logical processor") per core, and so on, or combinations thereof. Cores 920, 930 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

Representative details of core 920 are illustrated. Understand that core 930 and/or other present cores may include similar circuitry. As seen, core 920 includes one or more execution units 922 such as floating point and/or vector execution units. In addition, core 920 includes a memory execution engine 923 which may perform operations as described herein, in some embodiments. In other cases, operations described herein may be performed using a memory encryption engine 940.

In any event as further illustrated in FIG. 9, core 920 includes a TLB 924. In various embodiments, TLB 924 includes entries each having a translation from a linear address to a physical address. In some embodiments entries within TLB 924 also may include a KeyID (or a portion thereof). A page miss handler 925 may, when a translation for a given linear address is not included in TLB 924, perform a page walk of page tables (which may be stored in memory 960) to obtain a physical address (and possibly KeyID information). It is possible for core 920 to include cached portions of a key remapping table and a key table. More specifically as shown, core 920 includes a key remapping table 926 and a key table 928. Such tables may be implemented within a cache included in core 920. Or such tables may be implemented with dedicated cache storage. As described herein, these tables may store information regarding KeyID ownership and/or translations and keys associated with KeyIDs, respectively.

Processor 910 may include internal storage such as, for example, a processor cache 935 including one or more levels to store data (e.g., instructions, operands, program data, etc.) utilized by one or more components of processor 910. Cache 935 may not be encrypted and/or may share a same die as processor 910, on the same chip. In addition, the processor cache may be integrated onto one or more of cores 920, 930, as described above. Processor 910 includes a cache 935. Cache 935 may include any type of cache such as, for example, an instruction cache, a data cache, a single level cache, a multi-level cache, a shared cache, a strictly inclusive cache, an exclusive cache, and so on, or combinations thereof. For example, the cache 935 may include a mid-level cache, such as level 2 (L2), level 3 (L3), level 4 (L4), or other levels of cache, a last level cache (LLC), and so on, or combinations thereof. Cores 920, 930 may check whether data is located in cache 935 to execute one or more instructions and/or other data (e.g., program data, etc.), wherein a cache miss may cause a transfer of the data from memory 960 to cache 913 in a block of fixed size (e.g., cache line).

Each core 920, 930 may be, for example, coupled with respective memory via a respective memory controller such as a memory controller 950, coupled with shared memory via a shared memory controller, coupled with respective memory via a shared memory controller, and so on, or combinations thereof. In addition, a shared cache may be coupled with a shared memory controller, a plurality of caches may be coupled with a plurality of respective memory controllers, and so on, and combinations thereof. For example, memory controller 950 may be shared among cores 920, 930, may be coupled with cache 935 (e.g., shared multilevel cache), and may couple cores 920, 930 with memory 960 (e.g., shared DRAM). The memory controller 950 may be coupled with memory 960 (e.g., external memory, DRAM, etc.).

Processor 940 also includes memory encryption engine 940. The illustrated memory encryption engine 940 includes an encryptor 941, which may encrypt unencrypted data. The unencrypted data may include, for example, cleartext data, plaintext data, and so on, or combinations thereof.

Encryptor 941 may include any type of cipher to generate ciphertext data such as, for example, a block cipher in any desired mode of operation. The block cipher may include a fixed block size, wherein the block cipher may be repeatedly implemented to encrypt data larger than the block size. For example, the block cipher may include Advanced Encryption Standard (AES) in a propagating cipher-block chaining (PCBC) mode of operation. In addition, the block cipher may include an expandable block size.

In one example, the block cipher is Threefish, which may be implemented to obtain an expandable block size of any length (e.g., 256 bits, 512 bits, 1024 bits, etc.). For example, Threefish may utilize a tweak (e.g., 128 bits), which may include a memory address and/or location, and a key which may be the same width as the block. Threefish may utilize a number of rounds (e.g., 72) to encrypt for blocks of 256 bits and 1024 bits, and a number of rounds (e.g., 80) for blocks of 1024 bits, and so on. Threefish may utilize a function MIX including an addition operation, a rotation operation by a constant, and an exclusive-or (XOR) operation. Words may be permutated, for example, after each set of MIX functions (e.g., 2, 4, or 8, respectively by block size). A subkey may be injected into the system, for example, every number of rounds (e.g., 4) wherein the subkey may be generated by parts of the key, the tweak, and a counter value. The key and the tweak may be given an extra word at the end (e.g., an XOR of all the other words).

Memory encryption engine 940 also includes a decryptor 942, which may decrypt ciphertext data to generate unencrypted data. Decryptor 942 may include an inverse of encryptor 941. For example decryptor 942 may include an inverse of AES-PCBC. In addition, decryptor 942 may include an inverse of Threefish. For example, the subkeys may be applied in reverse order, with each round including the reverse word permutation followed by the reverse MIX functions. Thus, unencrypted data (e.g., plaintext data) may be implemented as input to encryptor 941 to generate an unreadable copy of the unencrypted data (e.g., ciphertext data) when the unencrypted data is to be stored in memory 960 (e.g., write instruction), wherein decryptor 942 may be implemented to decrypt the ciphertext data and generate the unencrypted data when the ciphertext data is to be fetched from memory 960 (e.g., read instruction).

Memory encryption engine 940 may read an encrypted data line and decryptor 942 may decrypt the encrypted data line, where the decrypted data line identifies the data line physical address, the integrity line index and the integrity line slot selector for the decrypted data line. A comparator (e.g., integrity verifier 944) may identify no match between the integrity line slot value stored and the key domain selector of the data physical memory address for the decrypted data line, and memory encryption engine 940 and/or comparator, responsive to the no match identification, may cause memory encryption engine 940 or a component thereof to flush the cache line, and report the no match condition as one or more of an error or a fault. Memory encryption engine 940 may also include a compressor/decompressor 947 to compress/decompress the data line bytes.

Memory encryption engine 940 may further include a key/tweak value selector 948 to select a key from a plurality of keys (e.g., a key domain) and/or a tweak from a plurality of tweaks (e.g., a tweak domain) for a physical location in memory 960. For example, the illustrated memory encryption engine 940 may include a function detector to determine that a function (e.g., a program, middleware, an operating system, firmware, virtual machine, VMM, OS kernel, etc.) or a part of the function (e.g., part of a program, etc.) is being launched for the first time, or is being given access to a physical location in the memory 960 for the first time. Key/tweak value selector 948 may, in response, select a key and/or a tweak for the physical location in the memory when the function (and/or part thereof) is given access.

Memory encryption engine 940 also includes logic 949, which may utilize components of processor 910 such as, for example, cores 920, 930, encryptor 941, decryptor 942, etc., to maintain (e.g., ensure, verify, test, etc.) the security and integrity of memory 960. Although not illustrated in FIG. 9, the apparatus 900 may include other elements on chip with the processor 911. For example, processor 910 may include input output (IO) control logic integrated with memory encryption engine 940. Additionally, while examples have shown separate components for illustration purposes, it is should be understood that one or more of the components of apparatus 900 may be combined, may reside in the same and/or different physical and/or virtual locations, and so on, or combinations thereof.

Embodiments thus may be used in a multi-tenant cloud computing environment to secure public cloud facilities using hardware. For example, cloud customers (tenants/consumers) may desire that their workloads be secure in a public cloud infrastructure. The techniques described herein may enable tenants/consumers to be protected from hacking, physical access, administrators, privileged software and the cloud provider itself. Moreover, as discussed herein, an unlimited number of key domains for an unlimited number of tenants/VMs/containers can be provisioned without consumption of additional physical address bits or cached metadata that would expand cache/die area. Additionally, with the cryptographic access control techniques herein, software can directly create data that dictates which memory pages are assigned to which key domain key, removing the need for complex architectural access control mechanisms within a processor.

In addition, embodiments enable cryptographic isolation for CSP customer workloads (tenants/domains), to enable removal of CSP software from a customer's TCB. Note that embodiments can be applied to any DRAM, or SCM-based memory, like NV-DIMM-N. In this way, disk encryption software can work with NVDIMMs in a direct access storage (DAS) mode for SCM. As such, software/applications may take advantage of performance benefits of NVDIMM DAS mode for SCM without compromising platform security requirements, and while meeting security requirements for CSPs.

While embodiments herein are described with VM isolation as an example application, other applications are possible such as NVRAM encryption, data corruption detection (DCD) using crypto-colors. For NVRAM encryption, the files stored on non-volatile memory are accessed using regular loads and stores and the disk encryption software can construct the linear address used to access files appropriately to encrypt files with the desired keys. Similarly for a DCD usage, a single process can be assigned multiple KeyIDs and with the help of a memory allocator, a piece of memory can be assigned different KeyIDs across allocation and de-allocation cycles by simply specifying the different KeyID in the linear address used to access the memory location. This can enable usages such as use-after-free detection when combined with memory integrity as data accessed with incorrect KeyID will fail the memory integrity check, thereby detecting corruption. With such usages, large numbers of keys (e.g., 1000s of files, multiple KeyIDs per process) can be accumulated by specifying the KeyID with a linear address affords this scalability in the KeyIDs. In the case greater amounts of keys are desired than possible with a given KeyID space, additional techniques to scale the number of keys may be used such as by wrapping keys and storing them in memory.

By using a non-canonical linear/logical address space to carry key identifier information within a software-defined memory address, embodiments provide a scalable solution, without changing native paging structures. It is to be noted that both the non-canonical address encoding and page table encoding methods for specifying KeyIDs can be used together to further increase the selectable key space.

While embodiments herein use keys and KeyIDs in the context of memory encryption and XTS, KeyIDs also may be used for memory integrity. That is, a message authentication code (MAC) (for example, SHA3 KMAC or counter mode Galois message authorization code (GMAC)) may be used in addition or alternatively to memory encryption, where a MAC value corresponds to each cache line stored in memory to verify the integrity of the cache line. The MACs may be looked up by the memory execution engine from an in-memory table or they may be stored in memory. When storing/writing a cache line to memory, the MACs are calculated over the cache line data (e.g., hash of the data) and a KeyID-selected key (and/or tweak and/or the memory address and/or the KeyID itself) and stored with or separately from the data in memory. When reading/loading a cache line from memory, the associated stored MAC is again loaded and checked against the loaded cache line data using the key (and/or tweak and/or the memory address and/or the KeyID itself) to assure the data was not modified while in memory and to assure the correct key was used. Note that software may change the key used for the MAC for a cache line of memory by directly writing data (a store without a preceding load operation) to the memory location with the new KeyID, a.k.a. a write-for-ownership. Software may first flush a particular cache line with the previous KeyID (e.g., via a CLFLUSH instruction using the linear address with the old KeyID), followed by a write-for-ownership for the new KeyID (e.g., a non-temporal move instruction (MOVNT) or equivalent) using a linear address specifying the new KeyID.

In another embodiment, in addition to or instead of using non-canonical linear address bits to include a KeyID, a processor register that may be written by VM/application software can store a KeyID, or part of a KeyID, to indicate which key (or tweak) to be used at the physical address (or cached metadata) level. Embodiments may further be used as a defense against software side channels, like Spectre. This is so, as a processor can speculate but data is still encrypted in the cache if a wrong KeyID was used. In this way, embodiments may defeat side-channels because if the data is encrypted, incorrect speculation will likewise operate on the encrypted data and data leak attacks like cache timing analysis will be rendered useless.

The following examples pertain to further embodiments.

In one example, an apparatus includes: a page miss handler to receive a full address including a linear address portion having a linear address and a key identifier portion having a key identifier for a key, the page miss handler to insert an entry for the full address in a translation storage, the entry including the key identifier and a physical address corresponding to the linear address; and a remapping table having a plurality of entries each to store information regarding a key identifier.

In an example, the remapping table is to store owner information comprising an owner identifier for an owner of the key identifier.

In an example, the page miss handler is to access the remapping table with the key identifier to determine the owner identifier for the owner of the key identifier.

In an example, the page miss handler is to insert the entry for the full address in the translation storage with a valid physical address in response to a determination that a provider of the full address is the owner of the key identifier.

In an example, the page miss handler is to insert the entry for the full address in the translation storage with an abort physical address in response to a determination that a provider of the full address is not the owner of the key identifier.

In an example, the remapping table is to store translation information to translate the key identifier to a second key identifier.

In an example, the page miss handler is to insert the entry for the full address in the translation storage, the entry including the physical address and the second key identifier.

In an example, the apparatus further comprises a memory execution circuit, where the memory execution circuit is to access a key storage with a first portion of the key identifier to obtain the key and to decrypt data using the key and a tweak obtained from a second portion of the key identifier.

In an example, the apparatus further comprises a memory execution circuit to receive a memory request having the full address and in response to a hit for the full address in a first entry of the translation storage, send a first physical address of the first entry of the translation storage to a memory to obtain data and access a key storage with the key identifier to obtain the key.

In an example, the memory execution circuit is to perform at least one of: decryption of the data with the key; and computation of a value based on the data using the key and comparison of the value to a message authentication code associated with the data.

In another example, a method comprises: receiving, in a core of a processor, a memory request having a full address including a key identifier and a linear address; accessing a remapping table with the key identifier to determine whether the key identifier is associated with a requester of the memory request; and in response to determining that the key identifier is associated with the requester, performing a page walk to map the linear address to a physical address and loading an entry in a translation lookaside buffer, the entry including at least the physical address.

In an example, the method includes, in response to determining that the key identifier is not associated with the requester, loading the entry in the translation lookaside buffer with a second physical address comprising an abort physical address for an abort page.

In an example, the method includes determining whether the translation lookaside buffer has an entry for the linear address, and if so, sending a physical address of the entry to a memory to obtain data.

In an example, the method includes accessing, using the key identifier, a key table to obtain a key.

In an example, the method includes decrypting the data obtained from the memory using the key.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system has a processor that includes: a page miss handler to access, using a linear address included in a memory request from a virtual machine, a plurality of page tables to obtain a physical address; and a translation lookaside buffer including a plurality of entries each to store a translation from a linear address to a physical address. The system may further include a memory coupled to the processor, the memory to store the plurality of page tables and a key table to store a plurality of keys, where the memory request further includes a key identifier included in a non-canonical portion of the linear address, the processor to obtain a key from the key table using the key identifier.

In an example, the processor further comprises a memory execution engine to determine an integrity of data obtained at the physical address using the key.

In an example, the key identifier comprises a first portion provided by a virtual machine monitor and a second portion provided by the virtual machine.

In an example, the processor further comprises a memory execution engine to decrypt data obtained at the physical address using a first key obtained from the key table with the first portion and the second portion as a tweak.

In an example, the processor further comprises a remapping table having a plurality of entries each to store an owner identifier for an owner of the key identifier, and the page miss handler is to access an entry of the remapping table with the key identifier included in the non-canonical portion of the linear address to determine whether the owner identifier of the entry matches the virtual machine, and if so, send the key identifier to a memory execution circuit to obtain the key from the key table.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a page miss handler to receive a full address including a linear address portion having a linear address and a key identifier portion having a key identifier for a key, the page miss handler to insert an entry for the full address in a translation storage, the entry including the key identifier and a physical address corresponding to the linear address; and
a remapping table having a plurality of entries to store information regarding key identifiers.

2. The apparatus of claim 1, wherein the remapping table is to store owner information comprising an owner identifier for an owner of the key identifier.

3. The apparatus of claim 2, wherein the page miss handler is to access the remapping table with the key identifier to determine the owner identifier for the owner of the key identifier.

4. The apparatus of claim 3, wherein the page miss handler is to insert the entry for the full address in the translation storage with a valid physical address in response to a determination that a provider of the full address is the owner of the key identifier.

5. The apparatus of claim 3, wherein the page miss handler is to insert the entry for the full address in the translation storage with an abort physical address in response to a determination that a provider of the full address is not the owner of the key identifier.

6. The apparatus of claim 1, wherein the remapping table is to store translation information to translate the key identifier to a second key identifier.

7. The apparatus of claim 6, wherein the page miss handler is to insert the entry for the full address in the translation storage, the entry including the physical address and the second key identifier.

8. The apparatus of claim 1, wherein the apparatus further comprises a memory execution circuit, wherein the memory execution circuit is to access a key storage with a first portion of the key identifier to obtain the key and to decrypt data using the key and a tweak obtained from a second portion of the key identifier.

9. The apparatus of claim 1, wherein the apparatus further comprises a memory execution circuit to receive a memory request having the full address and in response to a hit for the full address in a first entry of the translation storage, send a first physical address of the first entry of the translation storage to a memory to obtain data and access a key storage with the key identifier to obtain the key.

10. The apparatus of claim 9, wherein the memory execution circuit is to perform at least one of:
decryption of the data with the key; and
computation of a value based on the data using the key and comparison of the value to a message authentication code associated with the data.

11. At least one non-transitory computer readable storage medium comprising instructions that when executed enable a system to:
receive, in a core of a processor, a memory request having a full address including a key identifier and a linear address;
access a remapping table with the key identifier to determine whether owner information in the remapping table identifies a requester of the memory request as an owner of the key identifier; and
in response to determining that the remapping table identifies the requester as the owner of the key identifier, perform a page walk to (a) map the linear address to a physical address and (b) load an entry in a translation lookaside buffer, the entry including the key identifier and the physical address.

12. The at least one non-transitory computer readable storage medium of claim 11, further comprising instructions that when executed enable the system, in response to determining that the remapping table does not identify the requester as the owner of the key identifier, to load the entry in the translation lookaside buffer with a second physical address comprising an abort physical address for an abort page.

13. The at least one non-transitory computer readable storage medium of claim 11, further comprising instructions that when executed enable the system to determine whether the translation lookaside buffer has an entry for the linear address, and if so, send a physical address of the entry to a memory to obtain data.

14. The at least one non-transitory computer readable storage medium of claim 13, further comprising instructions that when executed enable the system to access, using the key identifier, a key table to obtain a key.

15. The at least one non-transitory computer readable storage medium of claim 14, further comprising instructions that when executed enable the system to decrypt the data obtained from the memory using the key.

16. A system comprising:
a processor including:
a page miss handler (a) to receive a memory request from a virtual machine, the memory request comprising a full address including (i) a linear address and (ii) a key identifier for a key, and (b) to insert an entry for the full address in a translation lookaside buffer, the entry including (i) a physical address corresponding to the linear address and (ii) the key identifier; and
a memory coupled to the processor.

17. The system of claim 16, wherein the processor further comprises a memory execution circuit to:
use the key identifier to obtain the key;
use the physical address to obtain data from the memory; and
use the key to perform at least one of:
decrypting the data; and
checking integrity of the data.

18. The system of claim 16, wherein the key identifier comprises a first portion provided by a virtual machine monitor and a second portion provided by the virtual machine.

19. The system of claim 18, wherein the processor further comprises a memory execution circuit to decrypt data obtained at the physical address using (a) a first key obtained from a key table with the first portion and (b) the second portion as a tweak.

20. The system of claim 16, wherein:
the processor further comprises a remapping table having a plurality of entries to store owner identifiers for respective owners of key identifiers; and
the page miss handler is to access an entry of the remapping table with the key identifier to determine whether the owner identifier of the entry matches the virtual machine, and if so, to send the key identifier to a memory execution circuit to obtain the key from a key table.

* * * * *